(12) United States Patent
Chen

(10) Patent No.: US 7,115,431 B2
(45) Date of Patent: Oct. 3, 2006

(54) METHOD OF FABRICATING REFLECTIVE LIQUID CRYSTAL DISPLAY INTEGRATED WITH DRIVING CIRCUIT

(75) Inventor: Hsin-Ming Chen, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 721 days.

(21) Appl. No.: 10/409,453

(22) Filed: Apr. 9, 2003

(65) Prior Publication Data

US 2004/0076742 A1 Apr. 22, 2004

(30) Foreign Application Priority Data

Oct. 22, 2002 (TW) ................. 91124415 A

(51) Int. Cl.
*H01L 21/84* (2006.01)

(52) U.S. Cl. ........................................ 438/30

(58) Field of Classification Search ............ 438/30, 438/151–166
See application file for complete search history.

(56) References Cited

U.S. PATENT DOCUMENTS

| 4,697,331 A | * | 10/1987 | Boulitrop et al. | ........... | 438/161 |
| 5,238,861 A | * | 8/1993 | Morin et al. | ................. | 438/155 |
| 5,466,617 A | * | 11/1995 | Shannon | ..................... | 438/155 |

* cited by examiner

Primary Examiner—Richard A. Booth
(74) Attorney, Agent, or Firm—Liu & Liu

(57) ABSTRACT

A method of forming a liquid crystal display device with a pixel TFT, a bottom electrode of pixel capacitor CL, and a storage capacitor Cs in a pixel region, and an n-type TFT and a p-type TFT in a driving circuit region is disclosed. Firstly, a metal layer and an n-type silicon layer are formed on a transparent substrate. Thereafter, a patterning step is performed to define some predefined regions for above devices. After an active layer and a gate oxide layer are formed in order on all patterned surfaces, another patterning step is done to form a first, a second, and a third preserved region, respectively, for a LDD region of the n type TFT, source/drain regions for the p type TFT and a LDD region for pixel TFT and Cs. Thereafter, a photosensitive layer is deposited and patterned to form a reflective bumps region. A metal layer is formed and patterned to form a cover over the reflective bumps region and gate electrodes for aforementioned TFT as well as an upper electrode for Cs. Subsequently, a blanket nLDD implant is performed. Thereafter, a p type source/drain implant is carried out using a photoresist pattern as a mask. After removing the photoresist pattern, a passivation layer is formed on all areas. Next an annealing is performed to active the implant impurities. Another patterning process is then performed to expose the metal reflective layer over the bumps region and to form contact by patterning the passivation layer.

15 Claims, 5 Drawing Sheets

METHOD OF FABRICATING REFLECTIVE LIQUID CRYSTAL DISPLAY INTEGRATED WITH DRIVING CIRCUIT

FIELD OF THE INVENTION

The present invention relates to a fabricating technique for liquid crystal display (LCD), and more particularly to a method of fabricating low temperature polysilicon reflective LCDs with a least number of photo masks to manufacture liquid crystal display pixels and driving circuits simultaneously.

BACKGROUND OF THE INVENTION

A liquid crystal display (LCD) is a flat display with property of low power consumption, and decreased significantly in either occupied space or weight in comparison with a conventional cathode ray tube (CRT) and without curve surface as a CRT display has. Hence, the liquid crystal display has widely been applied in all sorts of merchandises, including consumptive electronic products, such as pocket calculators, electronic dictionaries, watches, mobile phones, portable notebooks, communication terminals, display panels, desk-top personal computers, and even high dpi (dots per inch) television (HDTV) and so on. The most popular display is an active-type thin film transistor liquid crystal display (TFT-LCD) due to the fact that the viewing angle and the contrast performance are much better than those of a super-twisted nematic liquid crystal display (STN-LCD) of passive matrix type and the TFT-LCD shows more rapid response (such as several tens of milliseconds) than the STN-LCD does (such as several hundred milliseconds).

The primary elements of a TFT-LCD device include a fluorescent light tube, a light-guiding plate, a polarized film, a color filter, two glass substrates, a rubbing film, liquid crystal materials, and thin film transistors. The principle is as follows: At first, a ray is projected from a backlight source, i.e. a fluorescent light tube to a polarized film as well as liquid crystal molecules and cause the ray to changes proceeding direction thereof in accordance with the arrangement of the liquid crystal molecules. Afterward, the light passes through a color filter and another polarized film in order. Then as we vary the voltage actuating the liquid crystal, the intensity and color of the light can be adjusted in accordance with the voltage. Consequently, the liquid crystal panel can then present modes of diverse intensity and colors in response to the data retrieved.

A fluorescent light tube is employed as a backlight source and a diffuser, otherwise at least a side light source and a light-guiding plate are required as an alternative. As a result, more power is consumed and larger space is occupied. To reduce the power consumption and to fabricate a thinner liquid crystal display will be our aim and the reflective type LCD can meet our need. As to the reflective type LCD, since the light primarily comes from outside, the inbuilt lighting device can be simplified such that less space is occupied. Therefore, the reflective LCD can be applied under any environment unless the light is too dim.

Referring to the aforementioned TFT-LCD, in tradition the amorphous silicon has been the primary material in fabricating thin film transistor (TFT). However, for the current polysilicon is used to substitute the amorphous silicon and may become the mainstream in the future. This is because the polysilicon has carrier (either electron or hole) mobility higher than that of the amorphous silicon. Additionally, the polysilicon TFT-LCD has another advantage of being able to form the driving circuit (including nMOS transistor or pMOS transistor and even CMOS transistor) on the LCD panel and the pixels at the same time. As a result of the aforementioned reasons, the polysilicon-type TFT-LCD can be switched at higher speed than the amorphous-type silicon TFT-LCD and thus can catch the most attention. However, the foregoing mentioned polysilicon-type TFT-LCD is restricted to the transparent type TFT-LCD only. The U.S. Pat. No. 5,940,151 invented by Yong-Min Ha is one example.

Therefore, this invention discloses a manufacturing technique for LCD combining the polysilicon type and the reflective type.

SUMMARY OF THE INVENTION

The primary object of the present invention is to provide a manufacturing method for a low temperature polysilicon LCD. In this invention method, merely five photo masks are needed to complete the manufacture of the reflective type LCD and driving circuit at the same time.

Regarding to the object aforementioned, the present invention comprises following steps:

First a metal layer and a $n^+$-type conductive impurities doped polysilicon layer are formed successively on a substrate. Thereafter, a patterning step is performed to define predetermined regions for source and drain electrodes of a n-type TFT, source electrode of a p-type TFT, source and drain electrodes of a pixel TFT, and a predetermined region of a storage capacitor.

Thereafter, an un-doped active layer and a gate oxide layer are formed in order on overall surfaces. A laser annealing treatment is then performed to crystallize the active layer. Patterning the gate oxide layer and the active layer is executed to form a first preserved region overlaying source and drain electrodes of the n-type TFT and in-between, a second preserved region overlaying drain electrode of the n-type TFT and source electrode of the p-type TFT and in-between, and a third preserved region overlaying source and drain electrodes of the pixel TFT and in-between.

Afterward, a photosensitive resin layer is formed upon overall surfaces. Lithography technique is done to form a first and a second (optional) reflective bumps regions. The first reflective bumps region on which has a plurality of bumps is situated on the pixel TFT portion and functions as prime reflective region. A metal layer deposited on the first reflective bumps region latter will connect the drain electrode of the pixel TFT with the storage capacitor. The second reflective bumps region on which has more than one bump is situated on the source electrode of the pixel TFT and functions as minor reflective region. A metal layer deposited on the second reflective bumps region latter will connect the source electrode of the pixel TFT for decreasing the resistivity of the scanning line and widening the openings in the reflective bumps region. It is noted that there is certain interval between the first and second reflective bumps regions.

Afterward, a reflowing process is performed to blunt the sharp portions of the bumps. After that a gate metal layer is formed on overall surfaces. Subsequently, the gate metal layer is patterned to form a gate electrode for the N-type TFT, a gate electrode for the P-type TFT and a referenced electrode at the driving circuit portion as well as a gate electrode for the pixel TFT and a top electrode of the storage capacitor at the pixel portion; wherein the distance between the gate electrode of the N-type TFT/the pixel TFT and the drain electrode thereof is different from that between the gate electrode thereof and the source electrode thereof so as to reduce a leakage current.

Thereafter, using the patterned gate layer as a mask, n-type impurities are implanted into overall surfaces to form LDD regions. After that, a photoresist pattern which bares a predetermined region for the P-type TFT is formed on overall surfaces, and then p-type impurities are implanted to define the source and drain electrodes of the p-type TFT. Subsequently, after the photoresist pattern is removed, an annealing treatment is carried out to activate the impurities.

Finally, a passivation layer made of photosensitive resin is formed on overall surfaces, and then the passivation layer is patterned for removing the portions thereof on the first and second reflective bumps regions and forming contact holes at the driving circuit portion and at the edge of pixel TFT portion (not illustrated).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

The detailed description of the present invention is given by the following best mode for illustration.

Figure 1A:
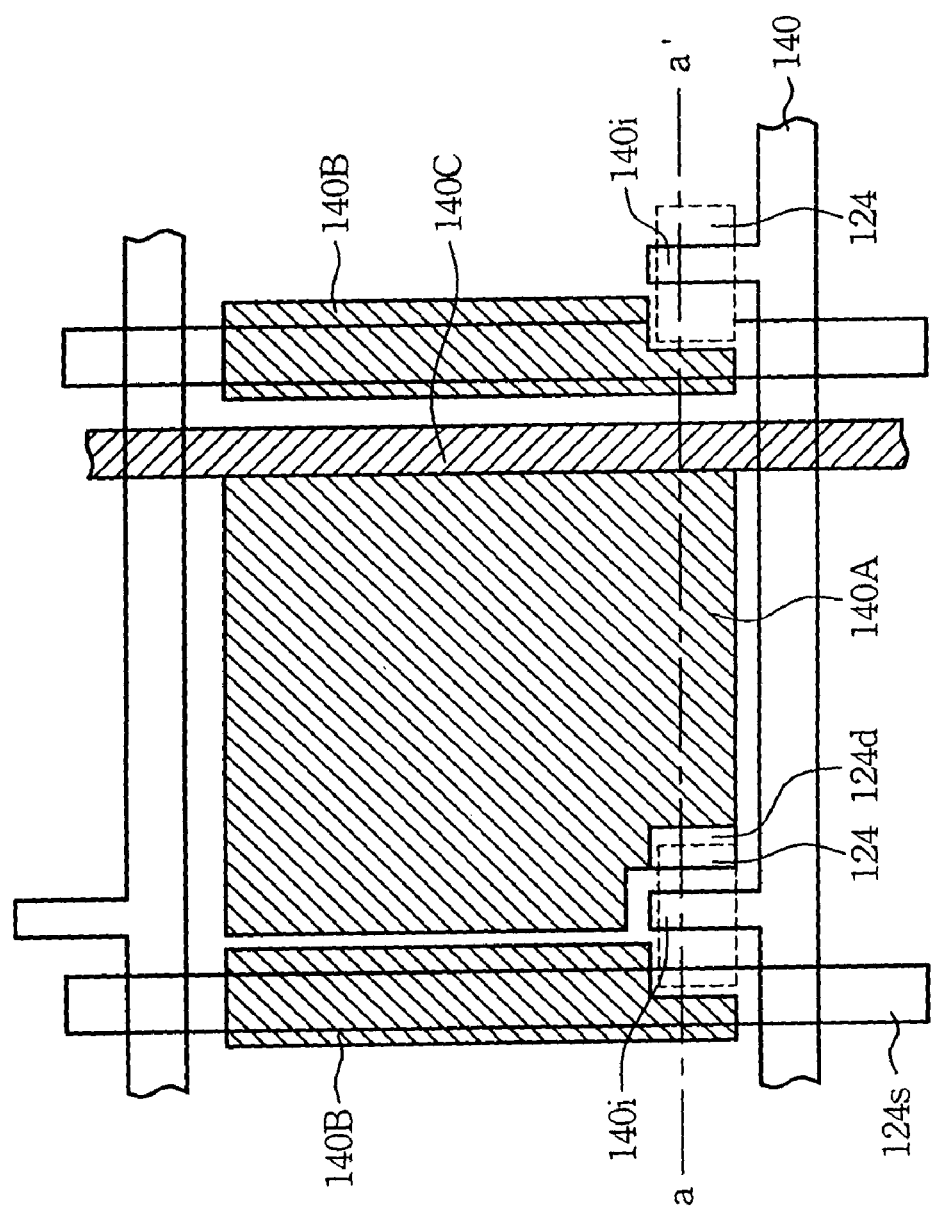
FIG. 1A is a plan view illustrating one pixel portion of a TFT-LCD in accordance with the current invention.

Please refer to FIG. 1A, which is a plan view illustrating a pixel portion of a TFT-LCD. A signal line 124s and a scanning line 140 vertically intersect each other as shown in FIG. 1A, wherein the scanning line 140 is directly connected to a gate electrode 140i of the pixel TFT portion and the signal line 124s is connected to the source electrode of the pixel TFT. A metal layer 140A on a first reflective bumps region occupies the majority of the pixel TFT portion and connects the drain electrode 124d of pixel TFT with the top electrode 140c of the storage capacitor. A metal layer 140B on a second reflective bumps region traverses the signal line 124s to connect the gate electrode of the next pixel TFT portion.

Figure 1B:
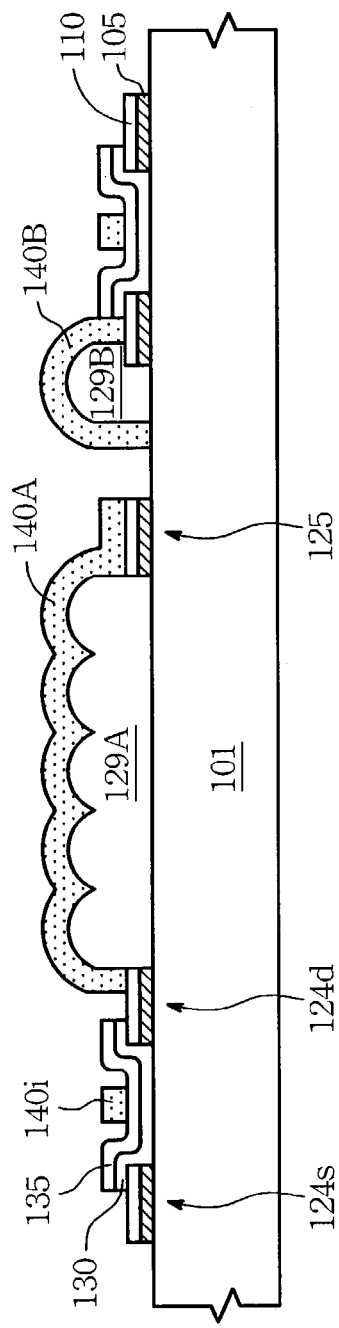
FIGS. 1B to 1H are cross-sectional views illustrating the steps of fabricating a conventional LCD, wherein the pixel portion is taken along line a–a' of FIG. 1A.

Please refer to FIG. 1B, which is a cross-sectional view taken along the line a–a' in FIG. 1A. According to the present invention, the metal layer of the first reflective bumps region at the pixel A portion connects the drain electrode of the pixel A with the top electrode of the storage capacitor 140c. A plurality of bumps covered by the metal layer of the second reflective bumps region is made from insulating materials and can prevent the connection between the metal layer thereon with the source electrode of the pixel TFT that resulted in the decrease of the resistivity of scanning line 140 due to enlarged area. It is noted that there is certain interval between the first and second reflective bumps regions.

Regarding to the manufacturing process of the present invention, please refer to FIGS. 1C to 1H, wherein the cross-sectional view illustrating the pixel TFT portion is taken along line a–a' of FIG. 1A.

Figure 1C:
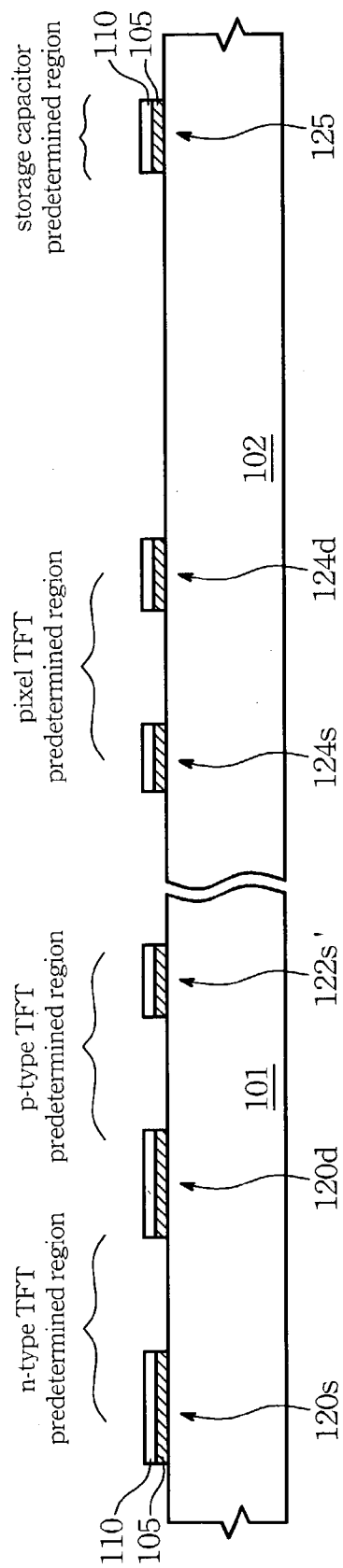
Figure 1D:
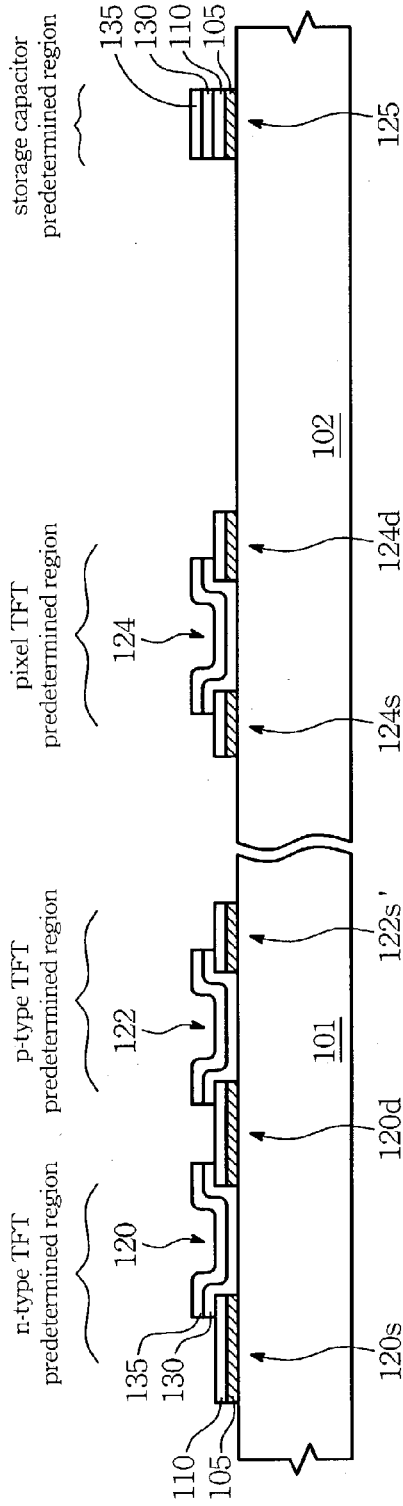

Please refer to FIG. 1C, which is a cross-sectional view of this invention. The formation steps are as follows: Firstly, a metal layer 105 and a polysilicon layer 110 doped with n+ conductive impurities are formed successively on a transparent substrate 100. Photolithography and etching techniques are performed to form predefined portions for source electrode 120s and drain electrode 120d of a n-type TFT and source electrode 122s' of a p-type TFT at the driving circuit portion 101 as well as predefined portions for source electrode 124s and drain electrode 124d of the pixel TFT at said pixel portion 102 and predefined portion for storage capacitor 125;

Subsequently, referring to FIG. 1D, an un-doped amorphous layer 130 and a gate oxide layer 135 are then deposited in order on the entire areas. Thereafter, a laser crystallizing process is conducted to transfer all amorphous silicon layers to polysilicon layers. After that the un-doped polysilicon layer 130 and the gate oxide layer 135 are patterned so as to define preserved regions 120, 122, 124, and dielectric layer 135, for the n-type TFT, the p-type TFT, the pixel TFT, and the storage capacitor, respectively. The preserved region 120 overlay a portion of the source electrode 120s as well as the drain electrode 120d of the n-type TFT and in-between. The preserved region 122 overlays a portion of the source electrode 120d of the n-type TFT as well as the drain electrode 122s of the p-type TFT and in-between. The preserved region 124 overlay a portion of the source electrode 124s as well as the drain electrode 124d of the pixel TFT and in-between.

Figure 1E:
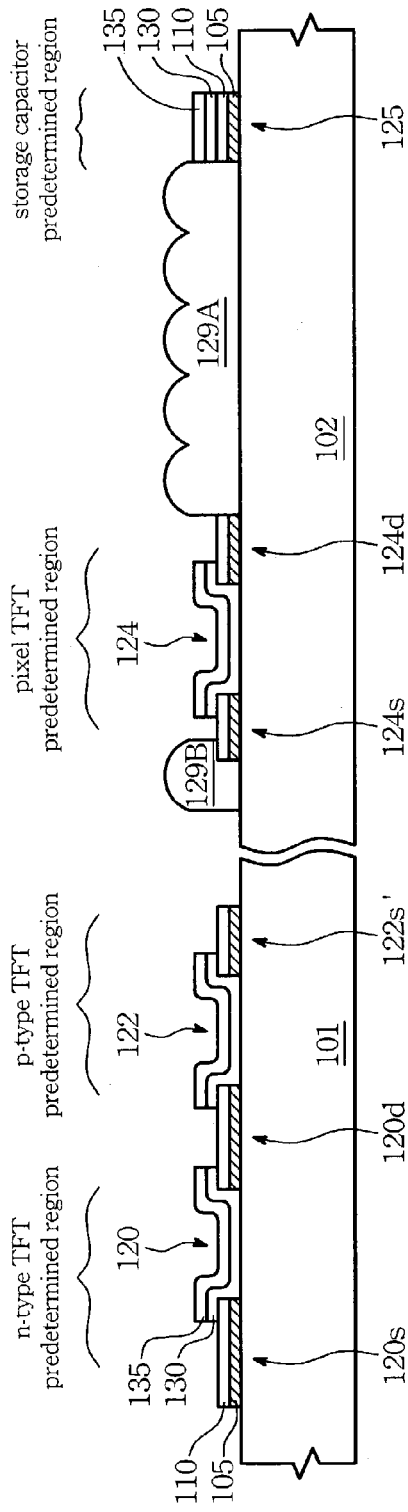

Thereafter, referring to FIG. 1E, a photosensitive layer is formed on all areas and then is patterned to form a prototype of the bumps. Afterward, a reflowing process is carried out to flat the surfaces of the bumps to form a first reflective bumps region and a second reflective bumps region.

A plurality of bumps sit on the first reflective bumps region and connect to each other at the bottom. Similarly, a plurality of bumps are formed optionally on the second reflective bumps region and transverse the signal line 124s. In this preferred embodiment the first reflective bumps region covers most part of the pixel TFT portion and functions as prime reflective zone. It is noted that a metal layer will be deposited latter on the first reflective bumps region for connecting the drain electrode of the pixel TFT with the top electrode of the storage capacitor. In addition, the predefined pixel TFT portion includes a bared region for upcoming LDD implantation and there is certain interval between the first and second reflective bumps regions.

Figure 1F:
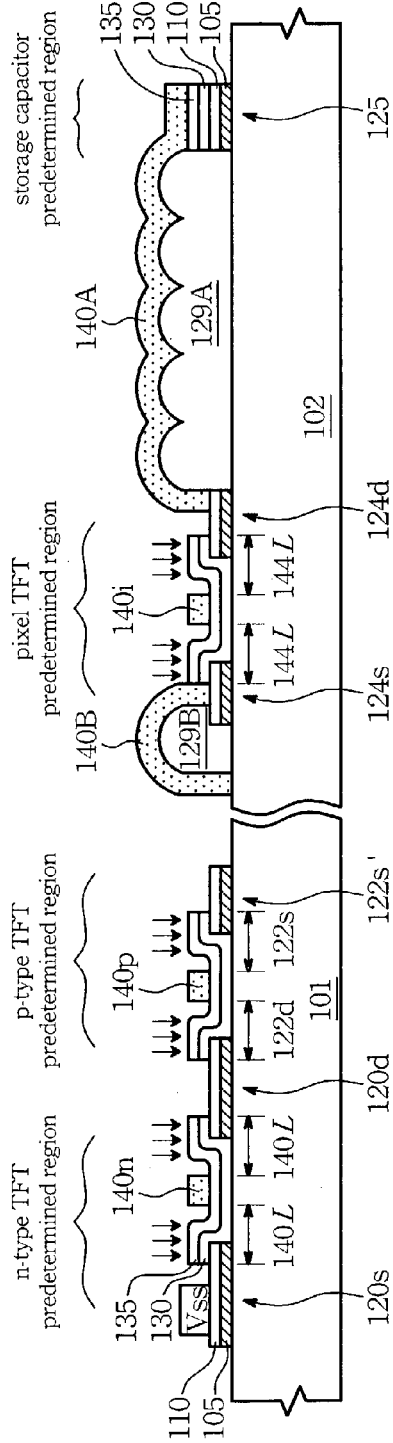

Referring to FIG. 1F, a gate metal layer is deposited on the entire areas. A patterning process is then carried out to form a reference electrode VSS, a gate electrode 140i of the pixel TFT, a top electrode 140c of the storage capacitor, a gate electrodes 140n of the n-type TFT, a gate electrodes 140p of the p-type on the driving circuit region 100, a metal layer of the first reflective bumps region, and a metal layer of the second reflective bumps region. It is noted that the metal layer of the first reflective bumps region connects the top electrode 140c of the storage capacitor with the drain electrode of the pixel TFT. Additionally, the metal layer of the second reflective bumps region is attached to the signal line 124s of TFT to enlarge the area of the signal line for decreasing the resisitivity.

Furthermore the remnant region of the preserved regions 120 on the left hand side and right hand side of the gate electrode 140n are preserved for forming LDD (lightly doped drain) regions 140L for the n-type TFT. The remnant region of the preserved regions 124 on the left hand side and right hand side of the gate electrode 140i are preserved for forming LDD (lightly doped drain) regions 144L for the pixel TFT.

It is noted that in order to reduce the possible leakage current when the TFT is at off-state, the distance between the gate electrode 140n and the source electrode 120s is not necessarily identical to that between the gate electrode 140n and the drain electrode 120d. For instance, the distance between the gate electrode 140n and the drain electrode 120d can be chosen greater than that between the gate electrode 1240n and the source electrode 120s to achieve the reduction of leakage current. For the same reason, the distance between the gate electrode 144i of the pixel TFT and the drain electrode 124d can be chosen greater than that between the gate electrode 124g and the source electrode 124s.

Thereafter, an nLDD ion implantation using n-type conductive impurities is implemented by utilizing all gate electrodes as masks to form a LDD region of the n-type TFT 140L and a LDD region of the pixel TFT 144L on preserved region 140L and 144L, respectively.

Figure 1G:
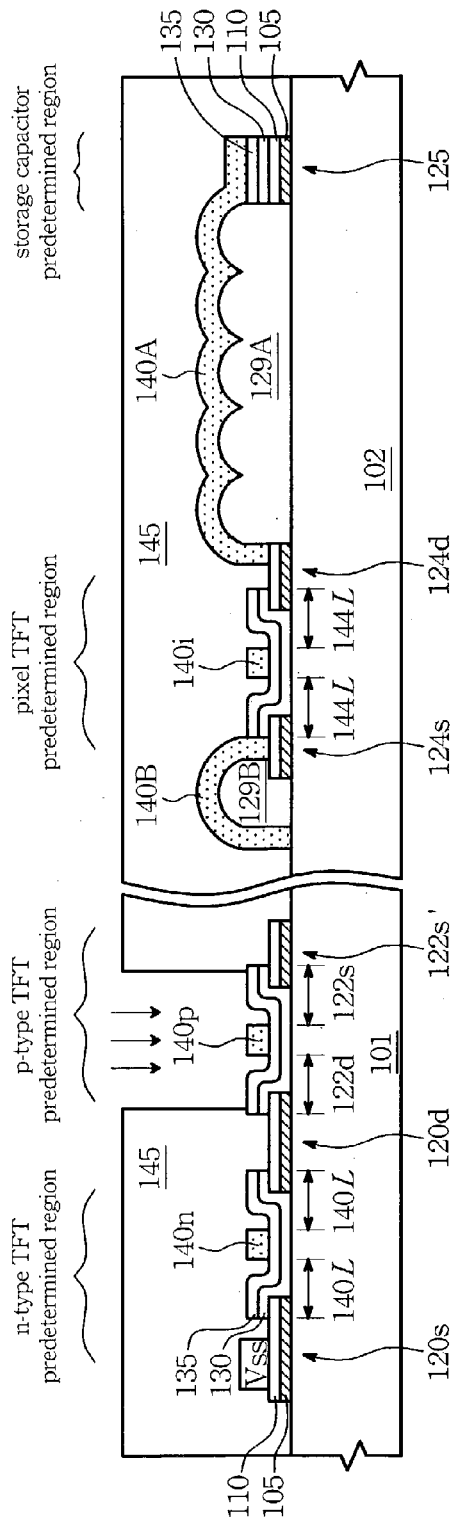

Turning to FIG. 1G, a photoresist pattern 145 is formed to cover overall surfaces except the predefined region for p-type TFT 122. P-type conductive impurities are then heavily implanted into overall surfaces to form a source region 122s and a drain region 122d of the p-type TFT by using the photoresist pattern 145 and the gate electrode of the p-type electrode as masks. The implantation dosage must be higher than the dosage of the n-type impurities of the LDD such that the source electrode 122s and the drain electrode 122d of the P-type TFT still have an enough concentration of the p-type conductive impurities after the electricity compensation.

Figure 1H:
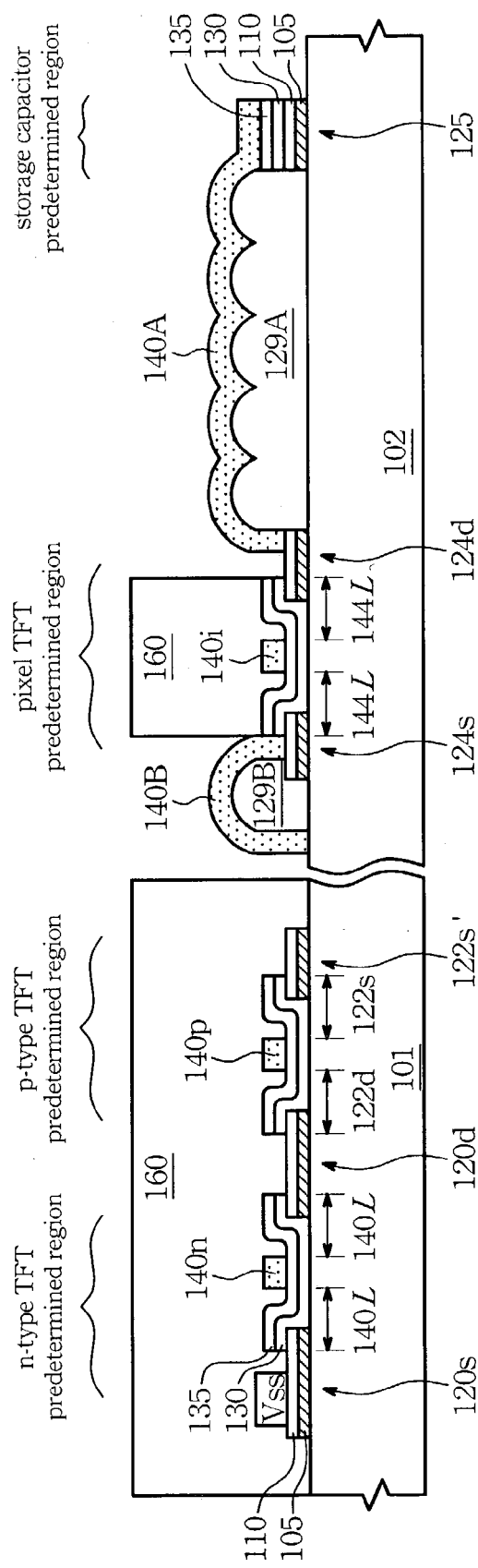

Referring to FIG. 1H, after the first photoresist pattern 145 is removed, a passivation layer 160 is formed on overall surface and planarized. The formation of the passivation layer 160 may have many options: for example, (1) a silicon nitride layer is deposited to cover all the devices at the driving circuit region as well as at the pixel region until overall surfaces are planarized; or (2) a silicon nitride layer is firstly deposited and then-a silicon oxide layer is deposited; or (3) a silicon nitride layer is firstly deposited with a portion of thickness and a photosensitive resin layer is subsequently deposited; or (4) a photosensitive resin is used as the only material of the passivation layer. For the two latter formations using the photosensitive resin, since the photosensitive resin per se can be exposed to form the pattern of contact holes as shown in FIG. 1E, the formation of a photoresist pattern can be left out. However, the photosensitive resin after formation usually has to be exposed under an UV light so as to remove its inherent color for being transparent. Under the (1) and (2) circumstances, an additional photoresist pattern is needed and later is transferred to the silicon nitride layer by photolithography and etching techniques. For the (3) and (4) circumstances, since the photosensitive can be patterned by itself, additional photoresist is not necessary.

Furthermore, in order to activate the conductive impurity ions and to cause Ohmic contact in between source and drain electrodes doped with n+ impurities, an annealing treatment is carried out before or after the passivation layer 160 is formed. In a preferred embodiment, if the material of the passivation layer is silicon oxide or silicon nitride, the annealing treatment should be conducted under the environment containing hydrogen so as to prevent the possible problems resulted from dangling bonds at the surface of the polysilicon. Nevertheless, if the passivation layer 160 comprises the photosensitive resin, the annealing treatment should be carried out before the formation of the photosensitive resin.

Finally the passivation layer 160 is patterned to expose the metal layer 140A of the first reflective bumps region and the metal layer 140B of second reflective bumps region as well as contact holes (not shown) at the edge the panel of the LCD for connecting conductive lines.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure

What is claimed is:

1. A method for manufacturing a reflective liquid crystal display including a pixel portion having a pixel TFT, a driving circuit portion having a first conductive type TFT and a second conductive type TFT, and a storage capacitor portion, said method comprising the steps of:

forming a metal layer over the substrate;

forming a first conductive type silicon layer over said metal layer;

patterning said metal layer and said first conductive type silicon layer to form predefined portions for source and drain electrodes of said first conductive type TFT and source electrode of said second conductive type TFT at said driving circuit portion as well as for source and drain electrodes of said pixel TFT at said pixel portion and for the storage capacitor;

forming successively an active layer and a gate oxide layer on all areas;

patterning said gate oxide layer and said active layer to form a first preserved region overlaying a portion of the source electrode as well as the drain electrode of the first conductive type TFT and in between, a second preserved region overlaying a portion of the source electrode of the first conductive type TFT as well as the drain electrode of the second conductive type TFT and in between, a third preserved region overlying a portion of the source electrode as well as the drain electrode of the pixel TFT and in between;

forming an insulator layer on all areas;

patterning said insulator layer to form a plurality of bumps over said pixel TFT portion;

forming a gate metal layer on all areas;

patterning said gate metal layer to form a reference electrode, a gate electrode for said first conductive type TFT, a gate electrode for said second conductive type TFT, a top electrode for said storage capacitor, and a reflective metal layer overlying said bumps thereby connecting the drain electrode of said pixel TFT with the top electrode of said storage capacitor;

doping impurities of said first conductive type into source and drain electrodes of said first conductive type TFT and of said pixel TFT by adopting LDD implantation and using all of said gate electrodes as masks;

forming a photoresist pattern on all areas except said second preserved region;

doping impurities of said second conductive type into source and drain electrodes of said second conductive type TFT by adopting LDD implantation and using said photoresist pattern and the gate electrode of said second conductive type TFT as masks, removing said photoresist pattern;

forming a passivation layer on all areas; and
patterning said passivation layer to expose said reflective metal layer and to form contact holes at the edge of said driving circuit portion and said pixel portion.

2. The method of claim 1, wherein said first conductive type and said second conductive type refer to n-type and p-type, respectively and said pixel TFT belongs to n-type.

3. The method of claim 1, wherein the step of forming said active layer further includes forming an un-doped amorphous layer and then performing laser annealing treatment to crystallize said amorphous layer.

4. The method of claim 1, wherein said insulator layer is a photosensitive layer.

5. The method of claim 1, wherein all surfaces undergo a reflowing treatment after said insulator is patterned and before said gate metal layer is formed so as to flatten said bumps.

6. The method of claim 1, wherein further comprises forming a second reflective bumps region on said pixel TFT portion for expanding openings in the bumps region larger and whereon said third preserved region is preserved bare for LDD implantation.

7. The method of claim 1, wherein the distance between said gate electrode of said first conductive type TFT and said drain electrode thereof is greater than that between said gate electrode thereof and said source electrode thereof, and similarly the distance between said gate electrode of said pixel TFT and said drain electrode thereof is greater than that between said gate electrode thereof and said source electrode thereof so as to reduce leakage current.

8. The method of claim 1, wherein said passivation layer is selected from the group consisting of photosensitive resin, a silicon nitride layer, an oxide layer, and the combination thereof.

9. The method of claim 1, wherein the steps of forming and patterning said passivation layer include depositing a photosensitive resin layer and then exposing said photosensitive resin layer to light by using a photo mask to form contact holes.

10. The method of claim 1, wherein further including one step of annealing treatment for activating said second conductive type impurities before forming said photosensitive resin layer.

11. The method of claim 1, wherein the steps of forming and patterning said passivation layer includes steps of:
depositing a silicon nitride layer;
performing an annealing treatment to activate said first conductive type impurities;
depositing said photosensitive resin layer on the overall surface;
patterning said photosensitive resin layer to expose said reflective metal layer and to form contact holes; and
patterning said silicon nitride layer by using said photosensitive resin layer as a mask to complete the structure of said contact holes.

12. A method for manufacturing a reflective liquid crystal display including a pixel portion having a pixel TFT, a driving circuit portion having a n-type TFT and a p-type TFT, and a storage capacitor portion having a storage capacitor, said method comprising the steps of:
forming a metal layer and, a n-type silicon layer over the substrate;
patterning said metal layer and said n-type silicon layer to form predefined portions for source and drain electrodes of said n-type TFT and source electrode of said p-type TFT at said driving circuit portion as well as for source and drain electrodes of said pixel TFT at said pixel portion and for the storage capacitor;
forming successively an active layer and a gate oxide layer on all areas;
patterning said gate oxide layer and said active layer to form a first preserved region overlying a portion of the source electrode as well as the drain electrode of said n-type TFT and in-between, a second preserved region overlying a portion of the source electrode of said n-type TFT as well as the drain electrode of said p-TFT and in-between, a third preserved region overlying a portion of the source electrode as well as the drain electrode of said pixel TFT and in-between;
forming a photosensitive layer on all areas;
patterning said photosensitive layer to form:
a first reflective bumps region on which a plurality of bumps sit upon said pixel TFT portion and said storage capacitor portion excluding said pixel TFT and said storage capacitor,
a second reflective bumps region on which a plurality of bumps overlying partially the source electrode of said pixel TFT excluding said third preserved region;
reflowing said plurality of bumps for flattening the surface thereon;
forming a gate metal layer on all areas;
patterning said gate metal layer to form a referenced electrode, a gate electrode for said n-type TFT, a gate electrode for said p-type TFT, a top electrode for said storage capacitor, a first reflective metal layer sitting upon said first reflective bumps region and connecting the drain electrode of said pixel TFT with the top electrode of said storage capacitor and a second reflective metal layer sitting upon said second reflective bumps region and attaching to the source electrode of said pixel TFT;
implanting n-type impurities into said oxide layer by adopting LDD implantation and using the gate electrodes of said n-type TFT and said pixel TFT as masks;
forming a photoresist pattern on all areas except said second preserved region;
implanting impurities of said p-type into said second preserved region by adopting LDD implantation and using the gate electrode of said p-type TFT and said photoresist pattern as masks to form the source and drain electrodes of said p-type TFT;
removing said photoresist pattern;
forming a passivation layer on all areas;
performing an annealing treatment to activate said n-type and p-type impurities;
patterning said passivation layer to expose said reflective metal layer and to form contact holes for electrical connection.

13. The method of claim 12, wherein the step of forming said active layer further includes forming an un-doped amorphous layer and then performing laser annealing treatment to crystallize said amorphous layer.

14. The method of claim 12, wherein all surfaces undergo a reflowing treatment after said insulator is patterned and before said gate metal layer is formed so as to flat said bumps.

15. The method of claim 12, wherein the distance between said gate electrode of said first conductive type TFT and said drain electrode thereof is greater than that between said gate electrode thereof and said source electrode thereof, and similarly the distance between said gate electrode of said pixel TFT and said drain electrode thereof is greater than that between said gate electrode thereof and said source electrode thereof so as to reduce leakage current.

* * * * *